(12) United States Patent
Ge (10) Patent No.: US 12,495,897 B2
(45) Date of Patent: Dec. 16, 2025

(54) CONNECTION PIECE OF COLUMNS OF GOODS RACK

(71) Applicant: Qingdao Lanshan Trade Co., Ltd, Qingdao (CN)

(72) Inventor: Zhiqiang Ge, Qingdao (CN)

(73) Assignee: QINGDAO LANSHAN TRADE CO., LTD., Qingdao (CN)

( * ) Notice: Subject to any disclaimer, the term of this patent is extended or adjusted under 35 U.S.C. 154(b) by 0 days.

(21) Appl. No.: 18/889,485

(22) Filed: Sep. 19, 2024

(65) Prior Publication Data

US 2025/0344850 A1   Nov. 13, 2025

(30) Foreign Application Priority Data

May 10, 2024 (CN) .......................... 202421002097.5
Jun. 12, 2024 (CN) .......................... 202421328781.2

(51) Int. Cl.
| A47B 57/08 | (2006.01) |
| A47B 47/00 | (2006.01) |
| A47B 47/02 | (2006.01) |
| A47B 57/50 | (2006.01) |
| A47B 96/14 | (2006.01) |

(52) U.S. Cl.
CPC .............. *A47B 57/08* (2013.01); *A47B 47/00* (2013.01); *A47B 47/021* (2013.01); *A47B 57/50* (2013.01); *A47B 96/1408* (2013.01)

(58) Field of Classification Search
CPC ... A47B 57/08; A47B 96/145; A47B 87/0215; A47B 96/1458; A47B 57/50; A47B 96/1475; A47B 47/021; A47B 96/1408; A47B 96/1441; A47B 87/0246; A47B 47/00; A47B 47/0083
See application file for complete search history.

(56) References Cited

U.S. PATENT DOCUMENTS

| 5,425,520 A | * | 6/1995 | Masumoto ............. A47B 96/06 403/231 |
| 5,463,966 A | * | 11/1995 | Nilsson .................... F16B 12/34 108/193 |
| 5,553,549 A | * | 9/1996 | Nilsson .................... A47B 9/00 108/147.11 |
| D572,054 S | * | 7/2008 | Liss .............................. D6/719 |
| D690,189 S | * | 9/2013 | Wojtowicz ..................... D8/394 |

(Continued)

*Primary Examiner* — Devin K Barnett
(74) *Attorney, Agent, or Firm* — HAUPTMAN HAM, LLP (57) ABSTRACT

A connection piece of columns of a goods rack, where the connection piece includes a connection body, the connection body has a bending structure matching the column, and anti-misplacement horizontal support plates facing toward a bending inner side and protruding along a direction perpendicular to the connection body are in a middle part of the connection body. A first column connection hole is at a lower part and an upper part of two bending sides of the connection body respectively. A second column connection hole matching the corresponding first column connection hole is on two bending sides of the column respectively. After both ends of the connection body are cooperated with two columns, ends of the two columns are respectively abutted against corresponding end faces of the corresponding anti-misplacement horizontal support plates. An expansion buckle is in the matching first column connection hole and second column connection hole.

9 Claims, 10 Drawing Sheets

(56) References Cited

U.S. PATENT DOCUMENTS

| | | | | |
|---|---|---|---|---|
| D693,668 S * | 11/2013 | Wojtowicz | | D8/394 |
| 8,714,864 B2 * | 5/2014 | Wojtowicz | | A47F 5/14 |
| | | | | 403/109.8 |
| D708,051 S * | 7/2014 | Wojtowicz | | D8/394 |
| 11,064,806 B1 * | 7/2021 | Ge | | A47B 87/0207 |
| 11,083,289 B2 * | 8/2021 | Németh | | A47B 87/0215 |
| 11,202,502 B1 * | 12/2021 | Berry | | A47B 47/0083 |
| 11,241,092 B1 * | 2/2022 | Liu | | F16B 7/042 |
| 11,627,800 B2 * | 4/2023 | Carrasco López | | A47B 57/34 |
| | | | | 211/187 |
| 12,096,855 B1 * | 9/2024 | Berry | | A47B 87/0215 |
| D1,063,600 S * | 2/2025 | Berry | | D8/394 |
| 12,274,360 B2 * | 4/2025 | Doherty | | A47B 87/0223 |
| 2006/0163438 A1 * | 7/2006 | Wojotowicz | | A47F 5/14 |
| | | | | 248/300 |
| 2011/0272542 A1 * | 11/2011 | Wojtowicz | | A47B 87/0215 |
| | | | | 248/218.4 |
| 2019/0059588 A1 * | 2/2019 | Liss | | A47B 96/1408 |

* cited by examiner

CONNECTION PIECE OF COLUMNS OF GOODS RACK

RELATED APPLICATIONS

The present application claims priority from Chinese Application Number 202421002097.5, filed May 10, 2024, and Chinese Application Number 202421328781.2, filed Jun. 12, 2024, the disclosure of which is hereby incorporated by reference herein in its entirety.

TECHNICAL FIELD

The present disclosure relates to the technical field of goods racks, and in particular to a connection piece of columns of a goods rack.

BACKGROUND

Goods racks are usually used to store goods in a workshop or warehouse. In order to solve the problems of difficult handling and large occupation space during transportation of goods racks, the existing goods racks are usually designed as detachable structure.

The existing detachable goods racks usually include several column assemblies distributed in polygon, where several support frames are detachably connected along a height direction among the column assemblies. A goods placement board is supported on each of the support frames. Each column assembly includes several columns distributed along the height direction. Detachable connection can be made between adjacent columns so as to make the entire goods racks adjustable in height.

However, in the existing connection structure, the adjacent columns are easily misplaced.

Based on the above, the present disclosure provides a connection piece of columns of a goods rack, which can quickly and conveniently realize connection between adjacent columns while preventing misplacement connection between adjacent columns.

SUMMARY

The object of the present disclosure is to provide a connection piece of columns of a goods rack so as to solve the shortcomings of the prior arts.

In order to achieve the above purpose, the present disclosure provides the following technical solution.

There is provided a connection piece in combination with columns of a goods rack, wherein each of the columns is presented as bending structure. The connection piece includes a connection body for insertion cooperation with two of the columns, the connection body has a bending structure matching each column, and anti-misplacement horizontal support plates facing toward bending inner side of the connection body respectively and protruding along a direction perpendicular to the connection body are disposed in a middle part of the connection body.

A first column connection hole is disposed at a lower part and an upper part of each bending side of the connection body respectively, and two corresponding first column connection holes on a same bending side from the bending sides of the connection body are respectively located at upper and lower sides of a corresponding anti-misplacement horizontal support plate from the anti-misplacement horizontal support plates.

Second column connection holes matching corresponding first column connection holes are disposed on two bending sides of each column respectively.

After both ends of the connection body are cooperated with the two of the columns in an insertion way, ends of the two of the columns are respectively abutted against corresponding end faces of the anti-misplacement horizontal support plates so as to realize anti-misplacement connection between the two of the columns, and an expansion buckle is disposed in one of the corresponding first column connection holes and one of the corresponding second column connection holes.

Preferably, the insertion cooperation between the connection body and the two of the columns is defined by column insertion grooves on the columns or insertion grooves on the connection body.

Preferably, the two bending sides of the column are respectively bent inwardly 1800 to form a parallel bending plate, and the column insertion groove is formed between the parallel bending plate and the corresponding bending side of the column.

When the insertion cooperation between the connection body and the column is implemented by the column insertion grooves on the column, the second column connection holes are respectively disposed on the bending sides in parallel to the parallel bending plates on the column.

The two bending sides of the connection body are matched with the two column insertion grooves on the column.

After both ends of the connection body are respectively inserted into the column insertion grooves of two columns, the ends of the two columns are respectively abutted against the corresponding end faces of the corresponding anti-misplacement horizontal support plates so as to realize anti-misplacement connection between the two columns.

Preferably, a bulging assembly for being held tightly inside the column insertion grooves is disposed on the connection body; the bulging assembly is disposed on the two bending sides of the connection body; the bulging assembly includes several bulges uniformly disposed along a vertical direction and facing toward the corresponding bending inner sides of the connection body.

Preferably, vertical support plates for being held tightly inside the column insertion grooves are disposed on the connection body; the vertical support plates are disposed at ends of the two bending sides of the connection body, and the vertical support plates are perpendicular to the corresponding bending sides of the connection body and extend along a vertical direction; a middle part of an edge of the vertical support plates away from the connection body is disposed as vertical plane; an upper end and a lower end of the edge of the vertical support plates away from the connection body are both rounded; a transitional inclined surface is disposed between one rounded corner of the vertical support plates and a corresponding end of the vertical plane.

Preferably, the anti-misplacement horizontal support plate is disposed along a full horizontal circumference of a cross section of the connection body.

Preferably, the two bending sides of the connection body are both bent inwardly to form an insertion groove portion respectively, and an insertion groove for the columns to run through is formed between each of the two insertion groove portions and an inner end face of the connection body.

After two columns are respectively inserted into two ends of the insertion grooves in the connection body, the ends of the two columns are respectively abutted against the corresponding end faces of the anti-misplacement horizontal support plates to realize anti-misplacement connection between the two columns.

Preferably, three protrusions facing toward an inner end face of the corresponding bending side of the connection body are evenly distributed along a vertical direction on an inner end face of each of the insertion groove portions.

Preferably, several gourd holes are evenly disposed along a height direction on the two bending side plates of the columns.

When the insertion cooperation between the connection body and the columns is implemented by the insertion grooves on the connection body, the gourd holes matching the first column connection holes are used as the second column connection holes.

The present disclosure has the following beneficial effects.

(1) The anti-misplacement horizontal support plates are disposed in the present disclosure. When the connection body is connected with two columns in an insertion way, the ends of the two columns are respectively abutted against the corresponding end faces of the anti-misplacement horizontal support plates to realize anti-misplacement connection between the two columns.

(2) In the present disclosure, when the connection body is connected with the columns, the expansion buckle is disposed in the matching first column connection hole and second column connection hole to realize tight connection between the columns and the connection body.

(3) In the connection piece of the present disclosure, the bulges or vertical support plates or protrusions are disposed to strengthen the insertion tightness of the connection body and the columns.

BRIEF DESCRIPTIONS OF THE DRAWINGS

The drawings of the specification constituting a part of the present disclosure are used to provide further understanding for the present disclosure. The illustrative embodiments and its descriptions of the present disclosure are used to interpret the present disclosure and do not constitute any improper limitation to the present disclosure.

Numerals of the drawings are described below:

1. column, 11. parallel bending plate, 12. column insertion groove, 13. gourd hole, 14. second column connection hole.

2. connection body, 21. anti-misplacement horizontal support plate, 22. first column connection hole, 23. expansion buckle, 24. bulge, 25. vertical support plate, 251. transitional inclined surface, 26. insertion groove portion, 27. insertion groove, 28. protrusion.

DETAILED DESCRIPTIONS OF EMBODIMENTS

The present disclosure will be further described below in combination with drawings and embodiments.

Embodiment 1

There is provided a connection piece in combination with columns of a goods rack, where a column 1 is presented as a bending structure. The connection piece includes a connection body 2 cooperating with the column 1 in an insertion way. The connection body 2 has a bending structure matching each column 1. Anti-misplacement horizontal support plates 21 facing toward bending inner sides of the connection body respectively and protruding along a direction perpendicular to the connection body 2 are disposed in a middle part of the connection body 2.

A first column connection hole 22 is disposed at a lower part and an upper part of each bending side of the connection body 2 respectively, and two corresponding first column connection holes 22 on a same bending side from the bending sides of the connection body 2 are respectively located at upper and lower sides of a corresponding anti-misplacement horizontal support plate 21 from the anti-misplacement horizontal support plates 21.

Second column connection holes 14 matching corresponding first column connection holes 22 are disposed on two bending sides of the column 1 respectively.

After both ends of the connection body 2 are cooperated with the two of the columns 1 in an insertion way, ends of the two of the columns 1 are respectively abutted against corresponding end faces of the anti-misplacement horizontal support plates 21 so as to realize anti-misplacement connection between the two of the columns 1. An expansion buckle 23 is disposed in one of the corresponding first column connection holes 22 and one of the corresponding second column connection holes 14, so as to realize tight connection between the columns 1 and the connection body 2.

Preferably, the insertion cooperation between the connection body 2 and the two of the columns 1 is defined by column insertion grooves 12 on the columns 1 or insertion grooves 27 on the connection body 2.

Embodiment 2

Figure 10:
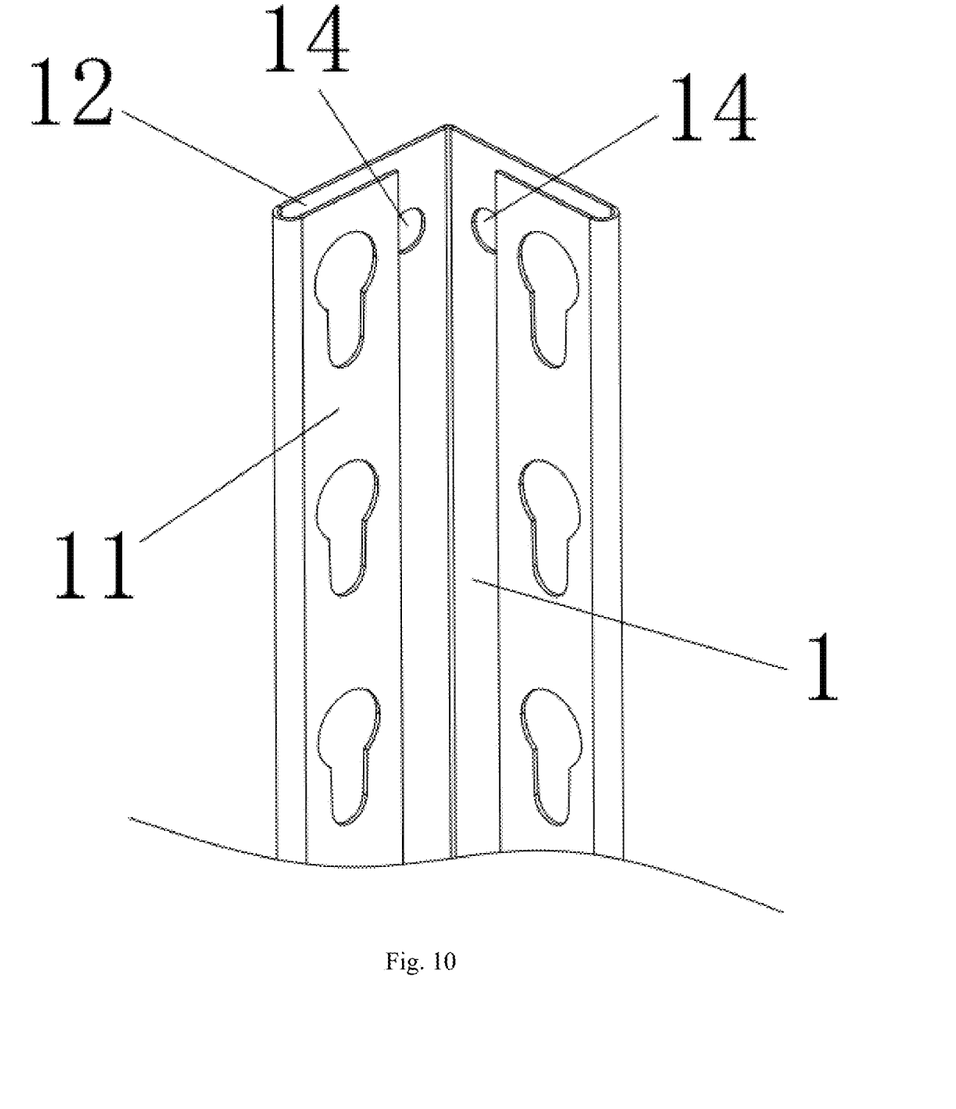
FIG. 10 is a schematic diagram illustrating the column to an embodiment 3 of the present disclosure.

On the basis of the embodiment 1, the two bending sides of the column 1 are respectively bent inwardly 1800 to form a parallel bending plate 11, and the column insertion groove 12 is formed between the parallel bending plate 11 and the corresponding bending side of the column 1.

When the insertion cooperation between the connection body 2 and the column 1 is implemented by the column insertion grooves 12 on the column 1, the second column connection holes 14 are respectively disposed on the bending sides in parallel to the parallel bending plates 11 on the column 1.

The two bending sides of the connection body are matched with the two column insertion grooves 12 on the column 1.

After both ends of the connection body 2 are respectively inserted into the column insertion grooves 12 of two columns 1, the ends of the two columns 1 are respectively abutted against the corresponding end faces of the corresponding anti-misplacement horizontal support plates 21 so as to realize anti-misplacement connection between the two columns 1.

Embodiment 3

Figure 1:
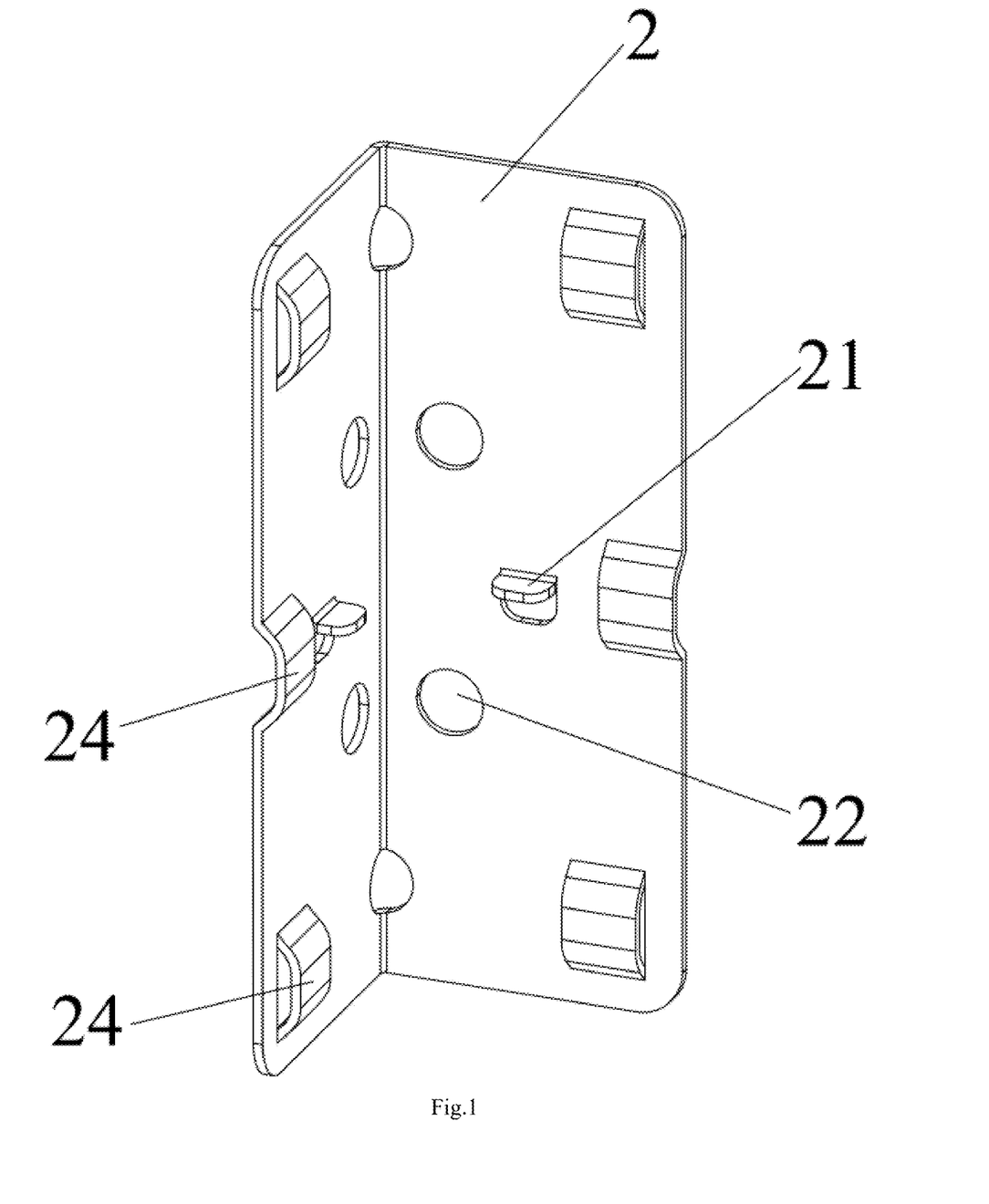
FIG. 1 is a structural schematic diagram illustrating a connection piece of columns of a goods rack according to an embodiment 3 of the present disclosure.

On the basis of the embodiment 2, a bulging assembly for being held tightly inside the column insertion grooves 12 is disposed on the connection body 2. As shown in FIG. 1, the bulging assembly is disposed on the two bending sides of the connection body 2. The bulging assembly includes several bulges 24 uniformly disposed along a vertical direction and facing toward the corresponding bending inner sides of the connection body 2. When the connection body 2 is cooperated with the column 1 in an insertion way, the bulges 24 fill the column insertion grooves 12 of the column 1 to achieve secure mounting effect.

Figure 2:
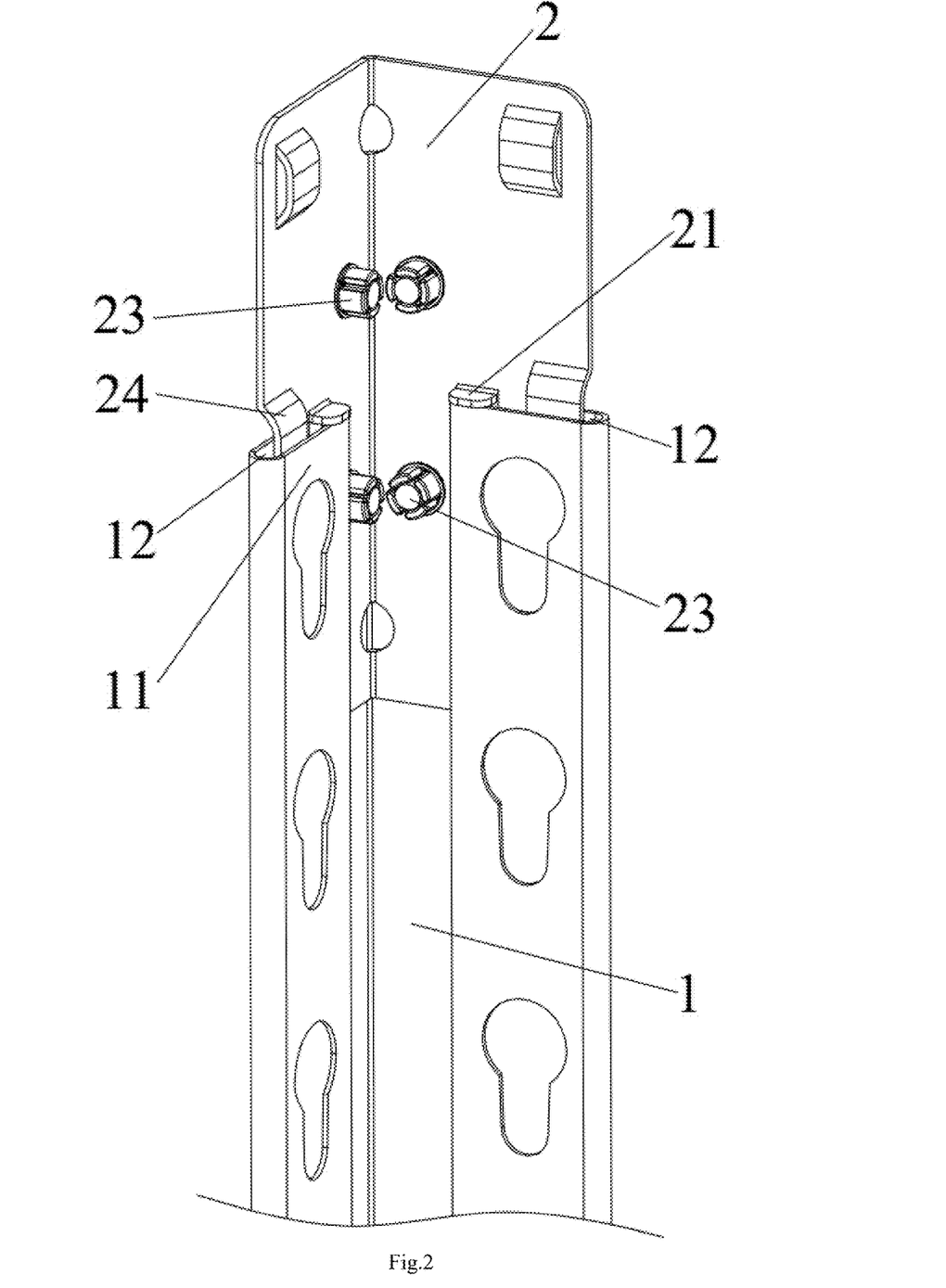
FIG. 2 is a schematic diagram illustrating cooperation between the connection piece of the columns of the goods rack in the embodiment 3 of the present disclosure and columns.

When adjacent columns 1 are connected with the connection piece of the columns of the goods rack in the embodiment 3, two ends of the connection body 2 are respectively inserted into the column insertion grooves 12 of two columns 1 and then the bulges 24 fill the column insertion grooves 12 of the columns 1 to achieve secure mounting effect. As shown in FIG. 2, the ends of the two columns 1 are respectively abutted against the corresponding end faces of the anti-misplacement horizontal support plates 21 to realize anti-misplacement connection between the two columns 1. Finally, the expansion buckle 23 is mounted in the matching first column connection hole 22 and second column connection hole 14 to realize tight connection.

Embodiment 4

Figure 3:
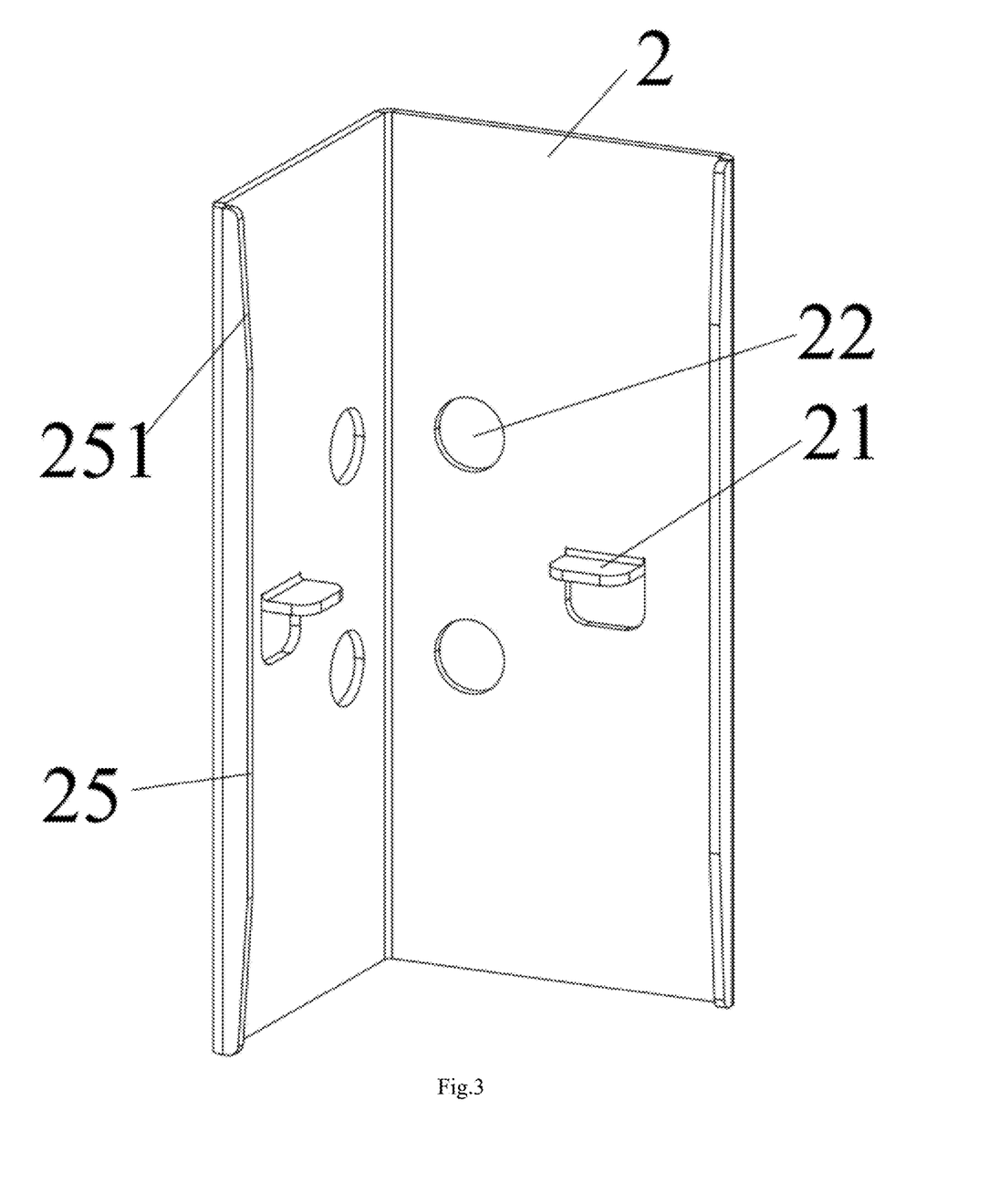
FIG. 3 is a structural schematic diagram illustrating a connection piece of columns of a goods rack according to an embodiment 4 of the present disclosure.

On the basis of the embodiment 2, vertical support plates 25 for being held tightly inside the column insertion grooves 12 are disposed on the connection body 2. As shown in FIG. 3, the vertical support plates 25 are disposed at ends of the two bending sides of the connection body 2, and the vertical support plates 25 are perpendicular to the corresponding bending sides of the connection body 2 and extend along a vertical direction. A middle part of an edge of the vertical support plates 25 away from the connection body 2 is disposed as vertical plane. An upper end and a lower end of the edge of the vertical support plates 25 away from the connection body 2 are both rounded. A transitional inclined surface 251 is disposed between one rounded corner of the vertical support plates 25 and a corresponding end of the vertical plane.

In the connection piece of the columns of the goods rack in the embodiment 4, the vertical support plates 25 are held tightly in the column insertion grooves 12 of the columns 1 and the disposal of the rounded corners and the transitional inclined surfaces 251 helps the connection body 2 to be inserted into the column insertion grooves 12 of the columns 1.

Figure 4:
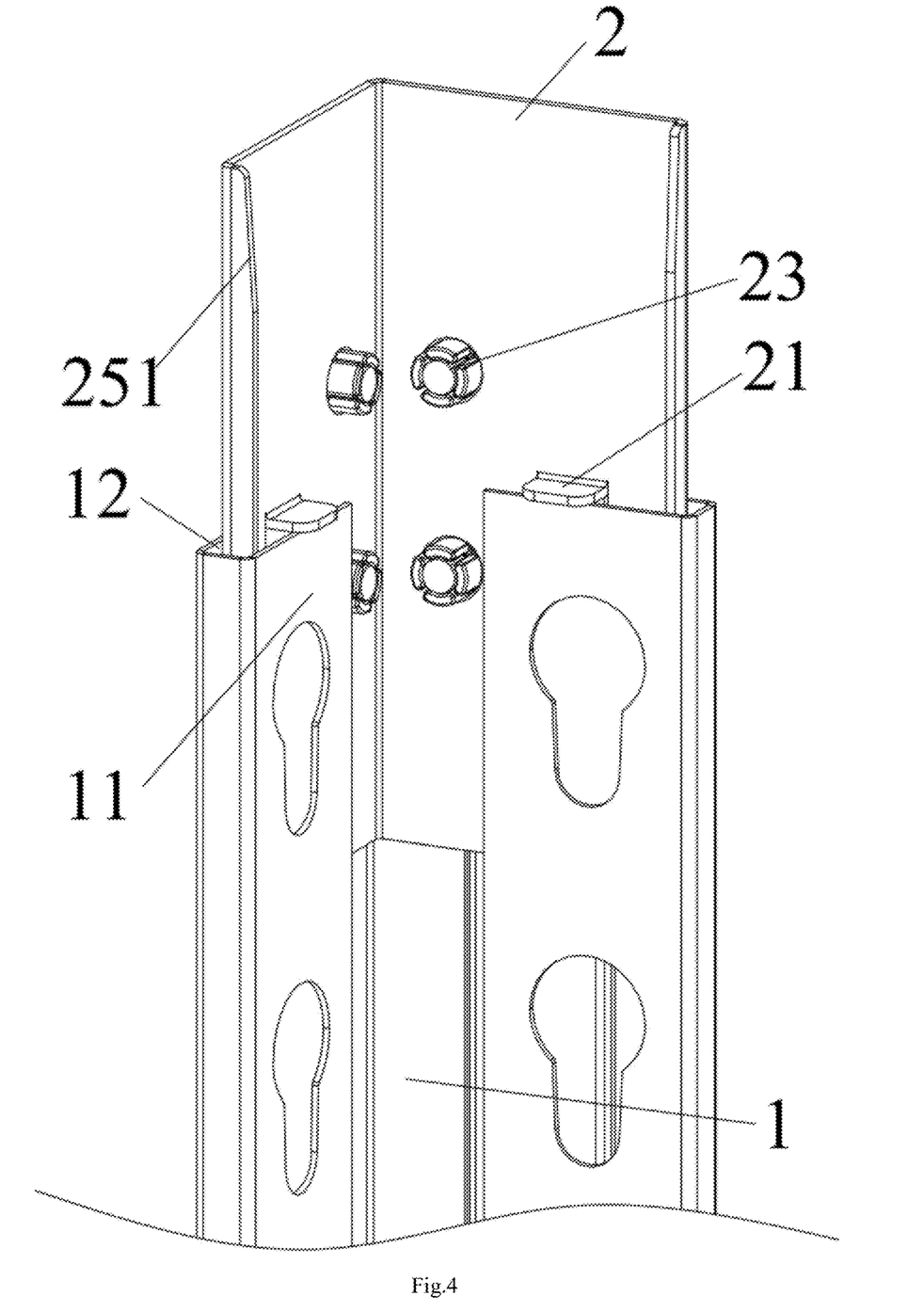
FIG. 4 is a schematic diagram illustrating cooperation between the connection piece of the columns of the goods rack in the embodiment 4 of the present disclosure and columns.

When adjacent columns 1 are connected with the connection piece of columns of the goods rack in the embodiment 4, two ends of the connection body 2 are respectively inserted into the column insertion grooves 12 of two columns 1 and then the vertical support plates 25 are held tightly in the column insertion grooves 12 of the columns 1. As shown in FIG. 4, the ends of the two columns 1 are respectively abutted against the corresponding end faces of the anti-misplacement horizontal support plates 21 to realize anti-misplacement connection between the two columns 1. Finally, the expansion buckle 23 is mounted in the matching first column connection hole 22 and second column connection hole 14 to realize tight connection.

Embodiment 5

Figure 5:
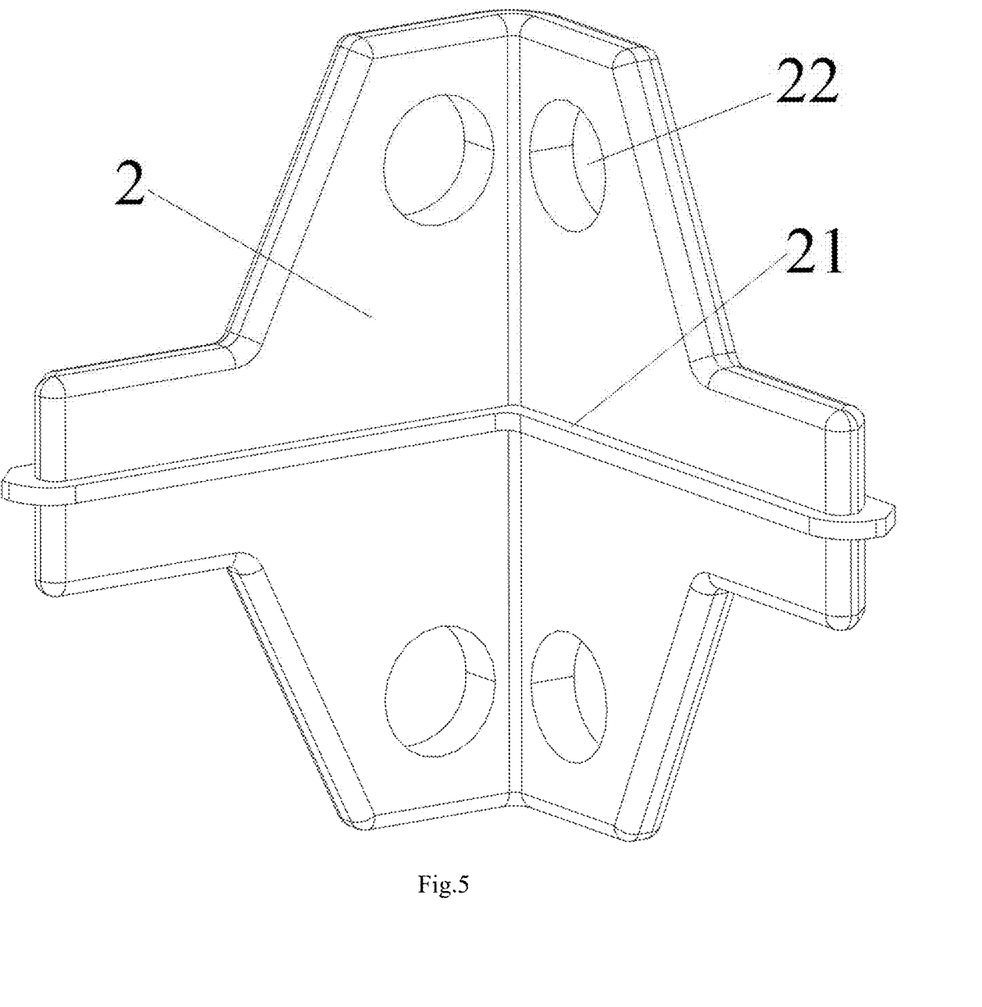
FIG. 5 is a structural schematic diagram illustrating a connection piece of columns of a goods rack according to an embodiment 5 of the present disclosure.

On the basis of the embodiment 2, as shown in FIG. 5, the anti-misplacement horizontal support plate 21 is disposed along a full horizontal circumference of a cross section of the connection body 2. The anti-misplacement horizontal support plate 21 disposed along the full horizontal circumference of the cross section of the connection body 2 can evenly bear a weight of the two upper and lower columns 1 while preventing the misplacement of the columns 1.

Figure 6:
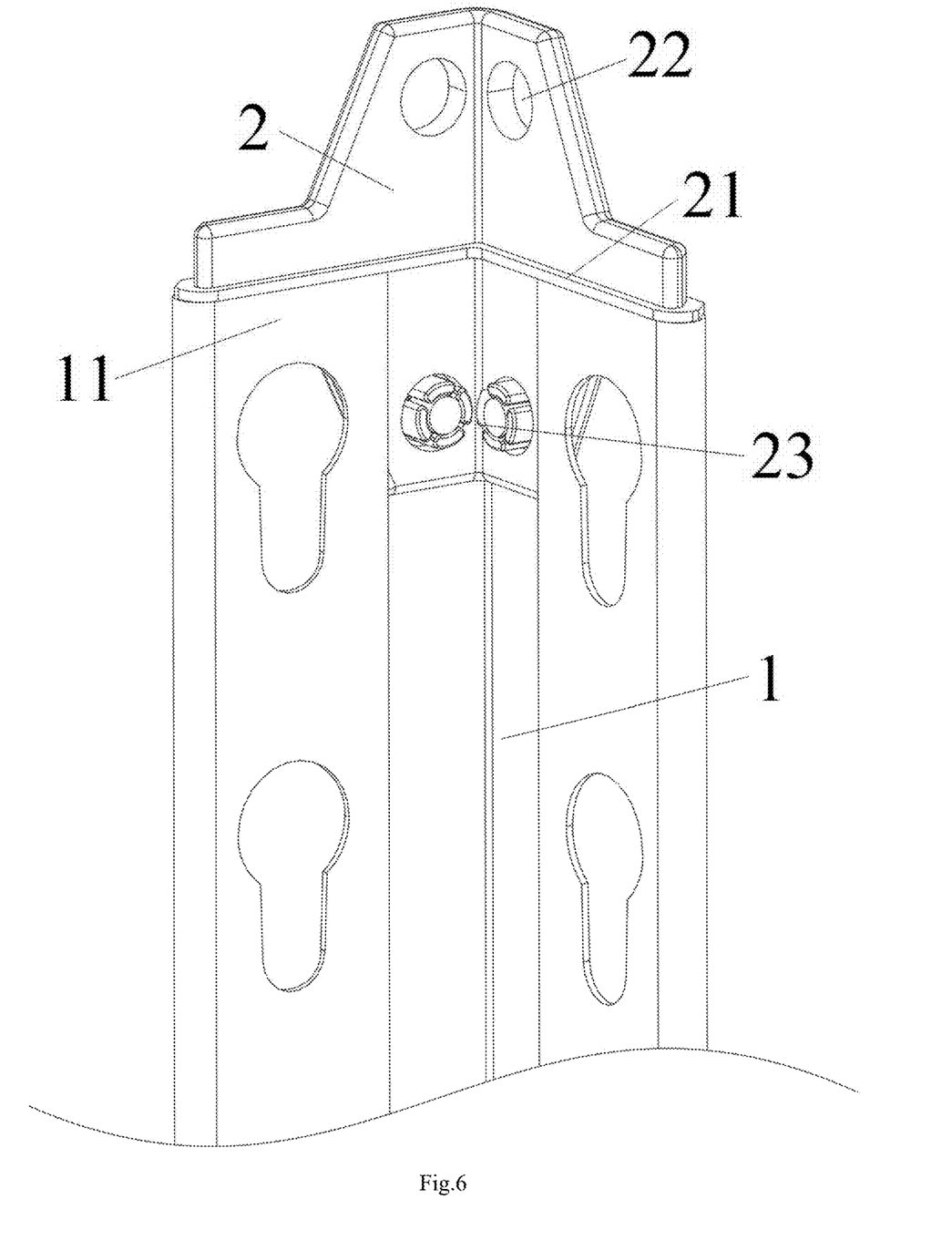
FIG. 6 is a schematic diagram illustrating cooperation between the connection piece of the columns of the goods rack in the embodiment 5 of the present disclosure and columns.

When adjacent columns 1 are connected with the connection piece of columns of the goods rack in the embodiment 5, two ends of the connection body 2 are respectively inserted into the column insertion grooves 12 of two columns 1 and then, as shown in FIG. 6, the ends of the two columns 1 are respectively abutted against the corresponding end faces of the anti-misplacement horizontal support plate 21 to share the weight of the two upper and lower columns 1 and realize the anti-misplacement connection between the two columns 1. Finally, the expansion buckle 23 is mounted in the matching first column connection hole 22 and second column connection hole 14 to realize tight connection.

Embodiment 6

Figure 7:
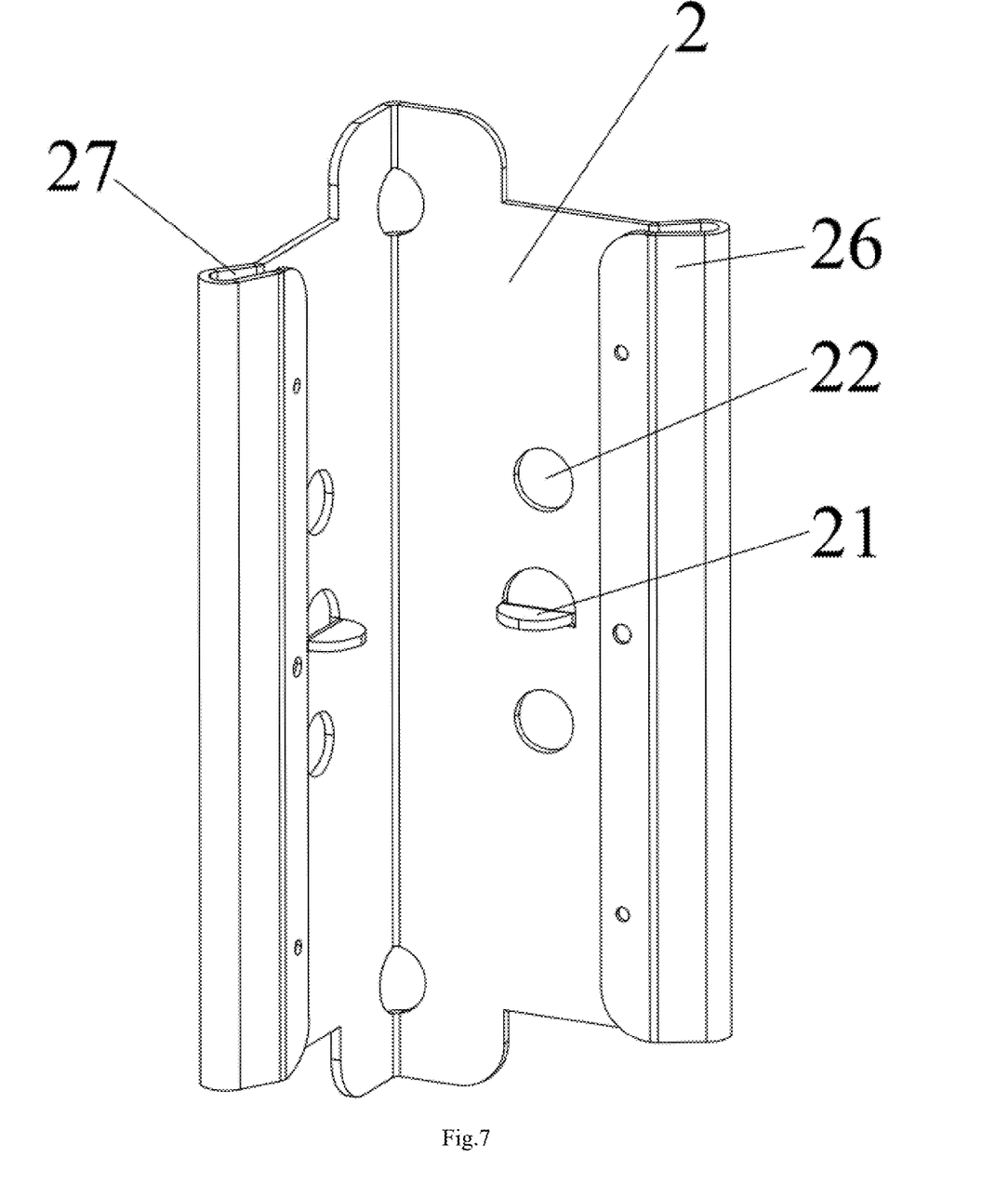
FIG. 7 is a structural schematic diagram illustrating a connection piece of columns of a goods rack according to an embodiment 6 of the present disclosure.
Figure 8:
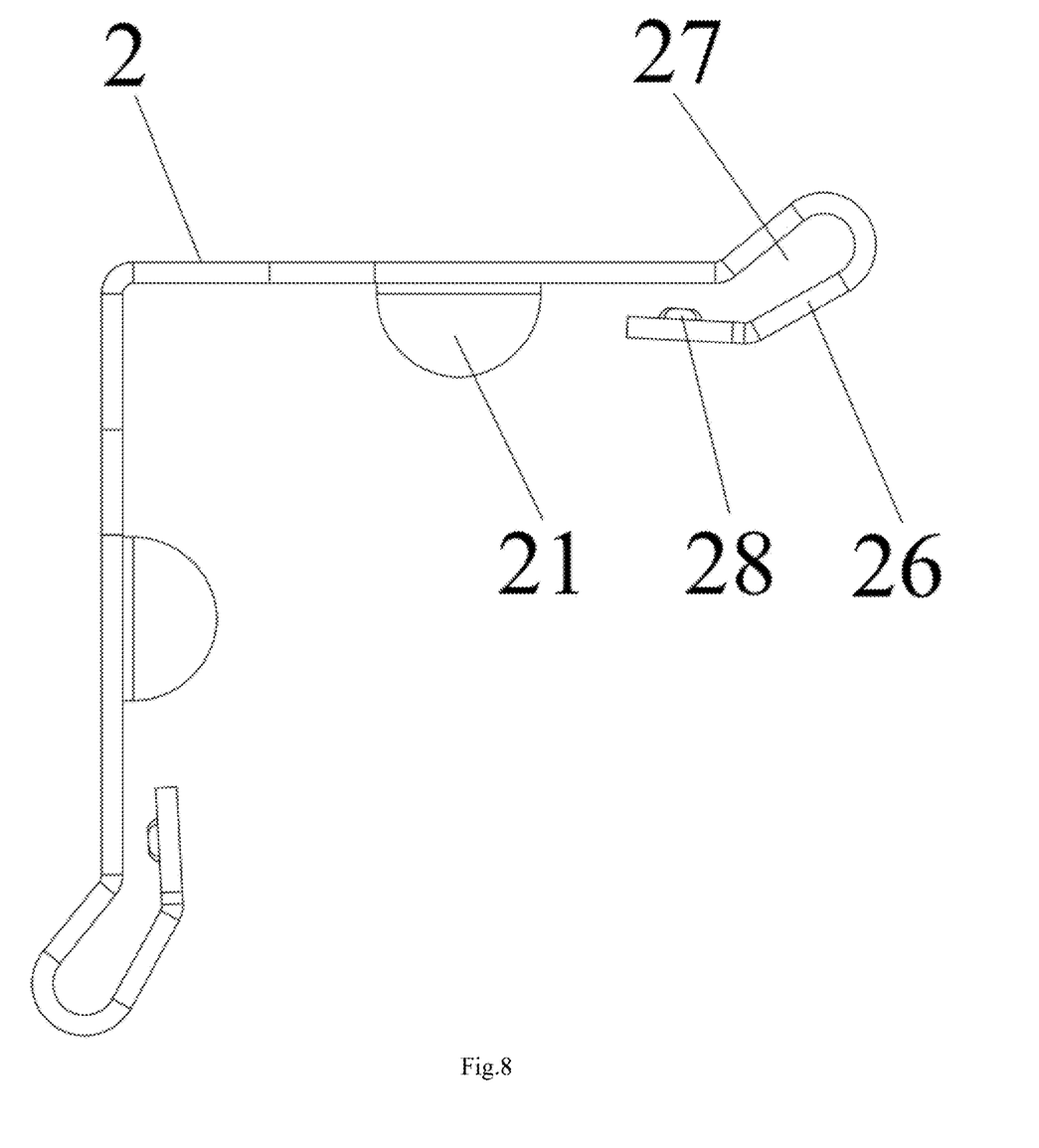
FIG. 8 is a structural schematic top view illustrating the connection piece of the columns of the goods rack in the embodiment 6 of the present disclosure.

On the basis of the embodiment 1, as shown in FIGS. 7 to 8, two bending sides of the connection body 2 are both bent inwardly to form an insertion groove portion 26 respectively, and an insertion groove 27 for the columns 1 to run through is formed between each of the two insertion groove portions 26 and an inner end face of the connection body 2.

After two columns 1 are respectively inserted into two ends of the insertion grooves 27 in the connection body 2, the ends of the two columns 1 are respectively abutted against the corresponding end faces of the anti-misplacement horizontal support plates 21 to realize anti-misplacement connection between the two columns 1.

Preferably, three protrusions 28 facing toward an inner end face of the corresponding bending side of the connection body 2 are evenly distributed along a vertical direction on an inner end face of each of the insertion groove portions 26. The disposal of the protrusions 28 can apply a pressing force to the inserted columns 1 so as to realize tight connection between the connection body 2 and the columns 1.

Preferably, several gourd holes 13 are evenly disposed along a height direction on the two bending side plates of the columns 1, where a large-head end of the gourd holes 13 is located above.

When the insertion cooperation between the connection body 2 and the columns 1 is implemented by the insertion grooves 27 on the connection body 2, the gourd holes 13 matching the first column connection holes 22 are used as the second column connection holes 14.

Figure 9:
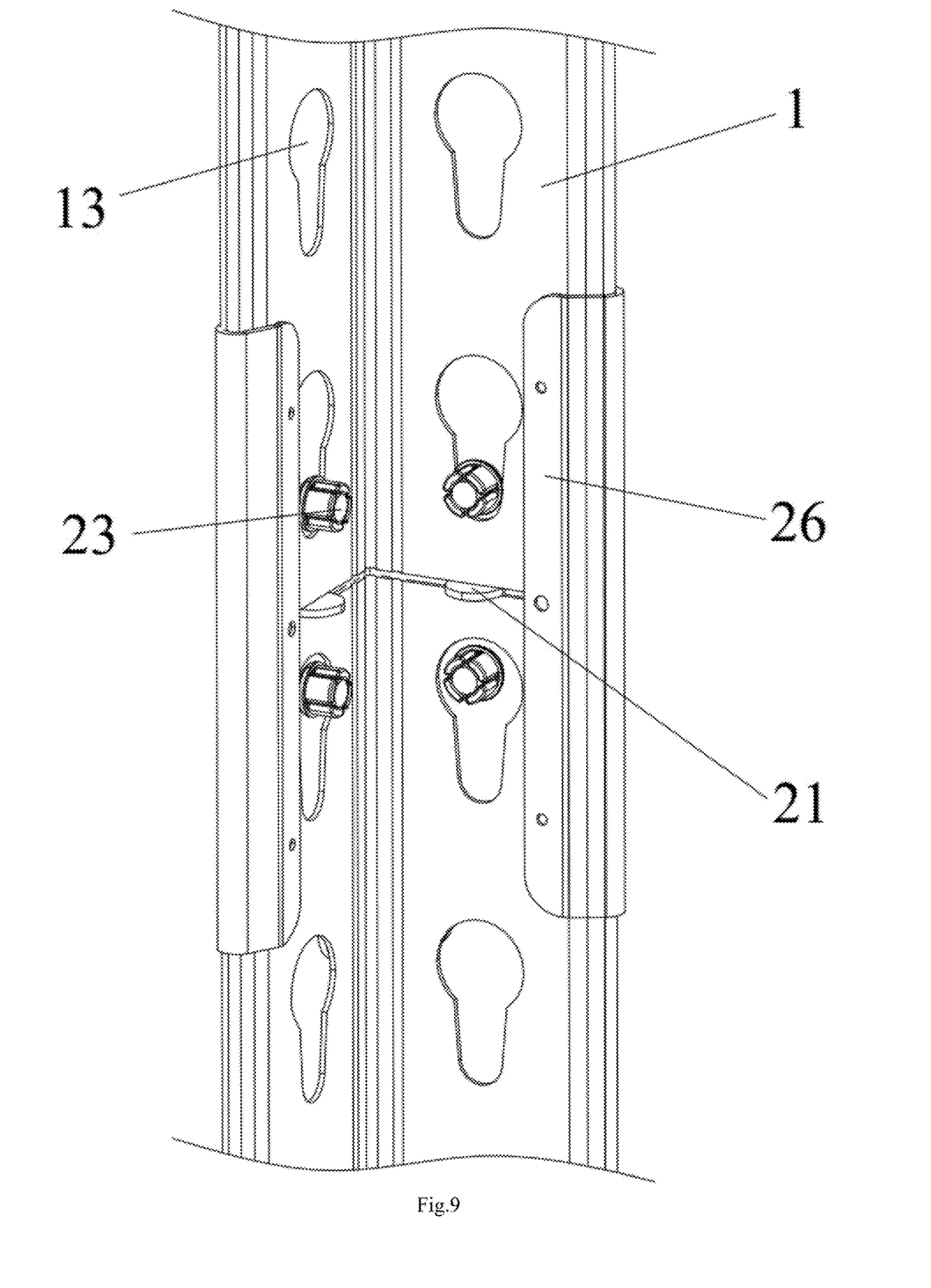
FIG. 9 is a schematic diagram illustrating cooperation between the connection piece of the columns of the goods rack in the embodiment 6 of the present disclosure and columns.

As shown in FIG. 9, when adjacent columns 1 are connected with the connection piece of columns of the goods rack in the embodiment 6, the corresponding ends of the two columns 1 are inserted into the insertion grooves 27 of the connection body 2, and the protrusions 28 in the insertion grooves 27 apply a pressing force to the inserted columns 1 and further the ends of the two columns 1 are respectively abutted against the corresponding end faces of the anti-misplacement horizontal support plates 21 to realize anti-misplacement connection between the two columns 1. Finally, the expansion buckle 23 is mounted in the matching first column connection hole 22 and gourd holes 13 to realize tight connection.

Embodiment 7

On the basis of the embodiment 3, 4 or 6, two anti-misplacement horizontal support plates 21 are disposed and located respectively on the bending sides of the connection body 2.

Although the above descriptions are made on the specific embodiments of the present disclosure in combination with the drawings, such descriptions are not intended to limit the present disclosure. Those skilled in the arts should understand that any changes or modifications made based on the technical solutions of the present disclosure without carrying out creative work shall still fall within the scope of protection of the present disclosure.

The invention claimed is:

1. A connection piece in combination with columns of a goods rack, wherein each of the columns is presented as bending structure; the connection piece comprises a connection body for insertion cooperation with two of the columns, the connection body has a bending structure matching each column, and anti-misplacement horizontal support plates facing toward bending inner sides of the connection body respectively and protruding along a direction perpendicular to the connection body are disposed in a middle part of the connection body;
   a first column connection hole is disposed at a lower part and an upper part of each bending side of the connection body respectively, and two corresponding first column connection holes on a same bending side from the bending sides of the connection body are respectively located at upper and lower sides of a corresponding anti-misplacement horizontal support plate from the anti-misplacement horizontal support plates;
   second column connection holes matching corresponding first column connection holes are disposed on two bending sides of each column respectively;
   after both ends of the connection body are cooperated with the two of the columns in an insertion way, ends of the two of the columns are respectively abutted against corresponding end faces of the anti-misplacement horizontal support plates so as to realize anti-misplacement connection between the two of the columns, and an expansion buckle is disposed in one of the corresponding first column connection holes and one of the corresponding second column connection holes.

2. The connection piece of claim 1, wherein the insertion cooperation between the connection body and the two of the columns is defined by column insertion grooves on the columns or insertion grooves on the connection body.

3. The connection piece of claim 2, wherein the two bending sides of each column are respectively bent inwardly 1800 to form a parallel bending plate, and each column insertion groove is formed between the parallel bending plate and a corresponding bending side of each column;
   when the insertion cooperation between the connection body and the two of the columns is defined by the column insertion grooves on the columns, the second column connection holes are respectively disposed on the bending sides in parallel to the parallel bending plates on each column;
   the bending sides of the connection body are matched with two column insertion grooves on each column;
   after both ends of the connection body are respectively inserted into the column insertion grooves of two of the columns, the ends of the two of the columns are respectively abutted against the corresponding end faces of the anti-misplacement horizontal support plates so as to realize anti-misplacement connection between the two of the columns.

4. The connection piece of claim 3, wherein a bulging assembly for being held tightly inside the column insertion grooves is disposed on the connection body; the bulging assembly is disposed on the bending sides of the connection body; the bulging assembly comprises several bulges uniformly disposed along a vertical direction and facing toward the bending inner sides of the connection body.

5. The connection piece of claim 3, wherein vertical support plates for being held tightly inside the column insertion grooves are disposed on the connection body; the vertical support plates are disposed at ends of the bending sides of the connection body, and the vertical support plates are perpendicular to corresponding bending sides of the connection body and extend along a vertical direction; a middle part of an edge of the vertical support plates away from the connection body is disposed as a vertical plane; an upper end and a lower end of the edge of the vertical support plates away from the connection body are both rounded; a transitional inclined surface is disposed between a rounded corner of the vertical support plates and a corresponding end of the vertical plane.

6. The connection piece of claim 3, wherein the anti-misplacement horizontal support plate is disposed along a full horizontal circumference of a cross section of the connection body.

7. The connection piece of claim 2, wherein each of the bending sides of the connection body is bent inwardly to form an insertion groove portion respectively, and an insertion groove for the columns to run through is formed between each insertion groove portion and an inner end face of the connection body;
   after two columns are respectively inserted into two ends of the insertion grooves in the connection body, the ends of the two columns are respectively abutted against the corresponding end faces of the anti-misplacement horizontal support plates to realize anti-misplacement connection between the two columns.

8. The connection piece of claim 7, wherein three protrusions facing toward an inner end face of a corresponding bending side of the connection body are evenly distributed along a vertical direction on an inner end face of each insertion groove portion.

9. The connection piece of claim 8, wherein a plurality of gourd holes is evenly disposed along a height direction on two bending side plates of the columns;

when the insertion cooperation between the connection body and the columns is defined by the insertion grooves on the connection body, the plurality of gourd holes matching the first column connection holes are used as the second column connection holes.

\* \* \* \* \*